(12) United States Patent
Soler (10) Patent No.: US 9,799,085 B2
(45) Date of Patent: Oct. 24, 2017

(54) METHOD FOR PRODUCING ELECTRONIC CONTRACTS CERTIFIED BY A USER OF A TELECOMMUNICATIONS OPERATOR

(71) Applicant: Lleidanetworks Serveis Telematics, S.A., Lleida (ES)

(72) Inventor: Francisco Sapena Soler, Lleida (ES)

(73) Assignee: Lleidanetworks Serveis Telematics, S.A. (ES)

( * ) Notice: Subject to any disclaimer, the term of this patent is extended or adjusted under 35 U.S.C. 154(b) by 693 days.

(21) Appl. No.: 14/056,428

(22) Filed: Oct. 17, 2013

(65) Prior Publication Data

US 2015/0074006 A1    Mar. 12, 2015

(30) Foreign Application Priority Data

Sep. 6, 2013   (EP) .................................... 13382349

(51) Int. Cl.
| | | |
|---|---|---|
| *G06Q 50/00* | (2012.01) |
| *G06Q 50/18* | (2012.01) |
| *H04L 12/58* | (2006.01) |
| *H04M 15/00* | (2006.01) |
| *H04W 4/24* | (2009.01) |
| *H04W 4/14* | (2009.01) |
| *H04L 29/06* | (2006.01) |

(52) U.S. Cl.
CPC ............ *G06Q 50/18* (2013.01); *H04L 51/34* (2013.01); *H04L 63/0823* (2013.01); *H04M 15/844* (2013.01); *H04M 15/858* (2013.01); *H04W 4/14* (2013.01); *H04W 4/24* (2013.01)

(58) Field of Classification Search
CPC ... H04L 63/0823; H04L 51/18; H04L 9/3247; H04L 9/324; G06Q 30/018; G06Q 10/10; G06Q 50/18; G06Q 20/401; G06Q 20/38215; G06F 17/30011; G06F 17/248; G06F 21/33
USPC .......................................... 705/311, 317, 342
See application file for complete search history.

(56) References Cited

U.S. PATENT DOCUMENTS

| 5,809,116 A * | 9/1998 | Cairo ................. H04N 1/32101 358/400 |
| 2001/0011350 A1 * | 8/2001 | Zabetian ............ G06Q 20/3821 713/176 |

(Continued)

FOREIGN PATENT DOCUMENTS

| EP | 1533724 A1 | 5/2005 |
| JP | 2001319156 | 11/2001 |

OTHER PUBLICATIONS

European Search Report dated Feb. 10, 2014.

*Primary Examiner* — Gerardo Araque, Jr.
(74) *Attorney, Agent, or Firm* — Hayes Soloway PC (57) ABSTRACT

The object of the invention is a certification method of contracts in an electronic format wherein a telecommunication operator certifies sending a contract by a user customer of said operator to another user which is not a customer of the telecommunication operator by means of an electronic mail and/or SMS; and this can sign by means of the response to the electronic mail or to the SMS the acceptance or rejection of the contract in a reliable way, generating proof of the transaction in every moment, so that it can be considered a legally binding contract since the entire process is certified by a telecommunication operator.

7 Claims, 5 Drawing Sheets

(56) References Cited

U.S. PATENT DOCUMENTS

| | | | | |
|---|---|---|---|---|
| 2001/0027523 | A1* | 10/2001 | Wakino | H04L 63/123 726/26 |
| 2005/0108360 | A1* | 5/2005 | Zellner | H04L 29/12009 709/217 |
| 2006/0212703 | A1* | 9/2006 | Kojima | G06Q 20/3674 713/175 |
| 2007/0055866 | A1* | 3/2007 | Lee | H04L 63/0823 713/156 |
| 2008/0028220 | A1* | 1/2008 | Wyssen | G07D 7/20 713/176 |
| 2009/0287931 | A1* | 11/2009 | Kinsella | G06F 21/64 713/175 |
| 2010/0257352 | A1* | 10/2010 | Errico | G06F 21/32 713/151 |
| 2011/0060906 | A1* | 3/2011 | Lafon | H04L 9/321 713/168 |
| 2011/0093713 | A1 | 4/2011 | Blot-Lefevre | |
| 2013/0066777 | A1* | 3/2013 | Richards | G06Q 20/042 705/42 |
| 2013/0346325 | A1* | 12/2013 | Sege | G06Q 50/18 705/311 |
| 2016/0020909 | A1* | 1/2016 | Gardenes Linan | G06Q 10/1091 713/175 |

* cited by examiner

METHOD FOR PRODUCING ELECTRONIC CONTRACTS CERTIFIED BY A USER OF A TELECOMMUNICATIONS OPERATOR

OBJECT OF THE INVENTION

The object of the invention is a method for a telecommunications operator to be able to receive, redirect, deliver and certify acceptance of electronic contracts, from any sending customer user of the operator to one or several non-customer receiving users of the operator, generating proof of the entire transaction of the final operation to, finally, digitally sign and deliver to the customer sending users and to the non-customer receivers, a certificate as trusted operator and third party with the date of issue, initial conditions, date and time of delivery and response to those conditions by the non-customer receiver, also generating a proof record of the whole transaction.

BACKGROUND OF THE INVENTION

It is a known fact that electronic communications have become an essential and indispensable tool for any type of operation, both legal and illegal. Communications are used for every type of movements, making calls, sending messages, and so on, from an origin to a destination.

Telecommunication operators are those that provide the infrastructures which manage, direct and store much of this traffic. These telecommunication operators are subject to a regulation, among other things, for the use of radio spectrum which is limited, or for the use of resources for telephone numbering which is also limited.

Also, telecommunication operators keep records of the operations the users execute, with the purpose of, and among other things, rating, keeping a record of numbers associated to them, invoicing references, as well as keeping record of any transactional data used in the invoicing to the user. These records are kept for subsequent verifications of rating and/or follow-up of the traffic by the user.

Sometimes, judicial authorities request from telecommunication operators recorded data of the electronic transactions done, since operators are considered as trusted third parties for the purpose of providing these data, as well as any data that can help determine the natural or legal persons who have done the action of interest.

Once the requested data has been located by the judicial authorities, the operator issues a certificate in which the requested transactional data, frequency, destinations, and any other type of information the relevant judicial authority has requested, are explicitly stated.

This methodology, when is requested by any of the parties to a telecommunication operator, and is presented as a proof, has been even recently accepted as a proof by the Supreme Court (ATS 2501/2013, Spain Supreme Court, Civil Division).

Several methods and systems for the creation of contracts online are known in the state of the art, most of them being based on the contracting party sending a link to web environment monitored by a trusted third party, where several types of signatures can be stored, and in which the contracting party accepts the product or service supplier conditions. These methodologies have the disadvantage of not working in a closed web environment, preventing them from working for those not having a web access, require digital signatures or java applications for the signature thereof, which limit their application environment, and generally imply a sudden change of environment for the user, which is not the case of the method described in the present invention.

The invention object of the present application provides a solution for the disadvantages mentioned above, carrying out the whole process by certified e-mail and/or certified SMS sent by a telecommunication operator, resulting in a certified electronic contract between two parties, originated by a telecommunication operator being a trusted third party, including transmission data, transmitted data, attachments, a single record number and data, and other data both from an intermediate and a final state of the transmission.

DESCRIPTION OF THE INVENTION

According to what has been commented above, the object of the invention is a method for producing certified electronic contracts by a telecommunication operator customer by means of e-mail and/or SMS, in such a way that the operator customer receives a certificate as the contract conditions are sent to a non-customer third party, and this is answered by mail or SMS, including the response text, date, time and traceability thereof, adding a single transaction number.

The method for producing the certified electronic contract by a telecommunication operator object of the invention is characterized in that it comprises the following steps, and in that it incorporates at least an incoming mail server, outgoing mail server, a data base of outgoing elements server, a data base of incoming elements server, a timestamping server, incoming SMS server, outgoing SMS server and a data processing unit as certificate server which are interconnected among them:

Reception in the mail server of the incoming message sent by a customer user of the operator, with the conditions of the contract, to an address previously prepared of the type cliente@contrato.lleida.net. In the subject or topic of the message there should be placed the non-customer destination mobile number, space, non-customer destination email address and finally the usual subject or topic of the message.

Checking the user is authorized, is provided with credit to produce contracts and then proceeding to introduction and record in the text data base and the received components.

Originating in the data processing unit an electronic contract in an email format which is to be send from the address cliente@contrato.lleida.net enclosing the content sent by the customer of the operator, introducing specifically in the subject or topic of the email CERTIFIED ELECTRONIC CONTRACT Verifying the initial telephone number and if it exists, a contract is sent by certified SMS to that number.

Sending the mail with the contract via the outgoing electronic mail server with the contract data.

Accepting, by the non-customer receiver, the contract by means of an answer to the SMS or to the electronic mail, including a response.

Reception of the response by the non-customer destination.

Final generation of the certified email contract, including data sent, received, dates and issuing times and reception, and application of the digital signature and timestamp by the telecommunication operator.

Sending the certificate to the issuing sender through the mail server.

As stated above, the method object of the invention offers likewise the advantage that the content can be sent or specified by email, with the change of environment not being necessary, and generates proof of sending, reception, and acceptance of the content by a telecommunication operator.

DESCRIPTION OF THE DRAWINGS

To implement the present description and in order to provide a better understanding of the characteristics of the invention, according to a preferred embodiment thereof, a set of drawings is attached as part of this description, with an illustrative but not limitative purpose, which represents the following.

PREFERRED EMBODIMENT OF THE INVENTION

In view of FIGS. 1, 2, 3, and 4 where a series of diagrams are represented referring to a method object of the invention, method intended to create certified electronic contracts by a customer of a telecommunication operator, comprising all the process from sending an electronic message of a sending user to receiving the certified electronic contract by this same sender and the receiver or addressee.

Figure 1:
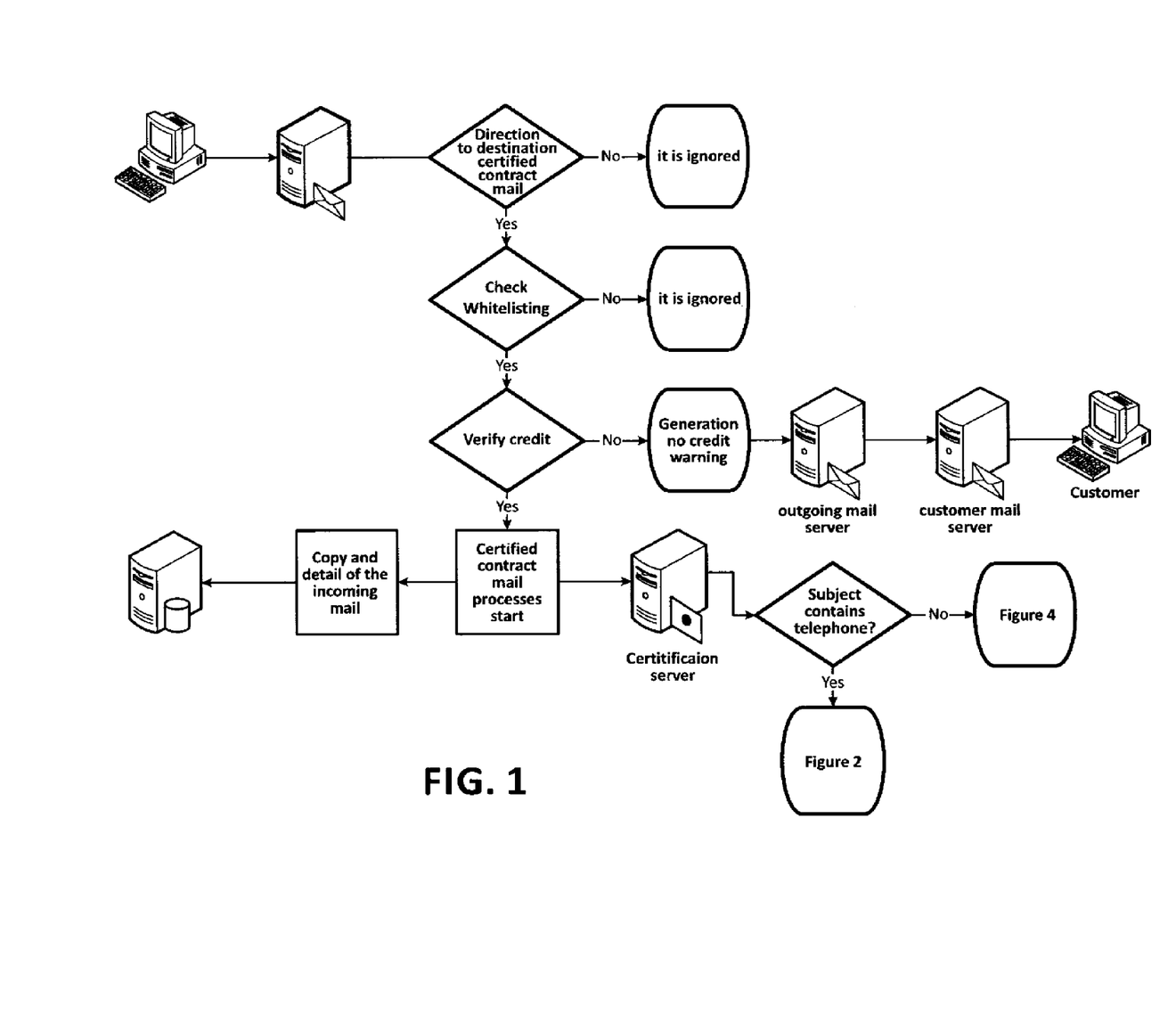
FIG. 1.—It shows a flow diagram of an exemplary embodiment of the method object of the invention for starting the generation of a certified email contract.

The sending user customer of the telecommunication operator sends the electronic message with the contract to accept and certify a destination address managed by an incoming mail server, being this an address of the type cliente@contrato.lleida.net. This message is a standard electronic mail, but with the format using in the subject or topic of the message data referred to at least one from: the destination mobile number to which the contract is addressed to, the electronic mail address of the contract and finally the subject text.

When the message arrives to the incoming mail server, this verifies if it is an email address which should generate contracts. If it is not configured as such, it is ignored. If it is an addressed enabled to generate certified electronic contracts, then it is verified if the sender user is enabled for that, that is, if it is in the certificates whitelisting which allows generation of certificates. If it is not in that list, the mail is ignored.

Once having verified the address is correct and enabled, and the sender may generate certificates, the verification of availability of credit from the customer user is carried out. If the user does not count with enough credit to generate contracts, a warning is issued through the internet notifying the user that the service must be recharged (top up).

If the user has an active status referred to as, for example, having enough credit, the process of the certified mail starts by detailing the inner message in all its components, sender, receiver, destination telephones, attachments and a serial number is added, placing everything in the data base of the incoming elements.

Afterwards, all data are sent to the certification server, which verifies if a telephone number is provided in the contract request. If the telephone is not provided, then process moves forward to the process described in FIG. 4, in which the process is only carried out by means of electronic mail. If the subject or topic contains a data referred to the destination telephone number, the process detailed in FIG. 2 it is done.

Figure 2:
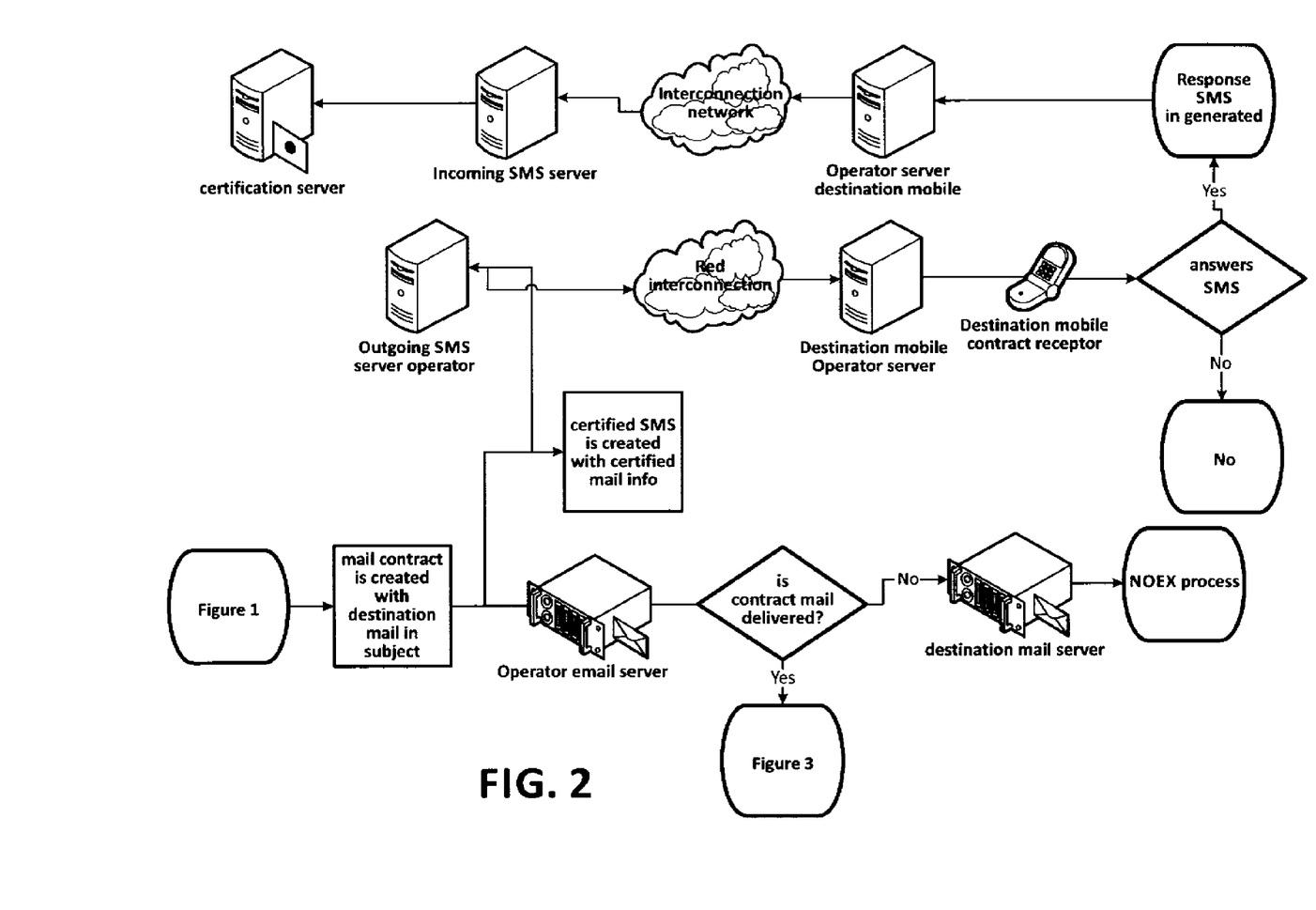
FIG. 2.—It shows a flow diagram of an exemplary embodiment of the method object of the invention for sending the request and receiving a response by certified SMS and email, specifically showing the SMS process.

If the subject includes the telephone, an electronic mail message is created comprising a legible content such as a text of the contract to be accepted in the mail sent by the user from a sender of the type cliente@contratos.server.com addressed to the mail included in the subject, and a certified SMS is generated indicating the telephone that is going to receive a contract with a condition, and in case the addressee is interested in accepting, then an affirmative response should be enough, either by SMS or by electronic mail. The process to SMS and email may be simultaneous or may be first the mail and then the SMS, depending on the market conditions, network or the customer requirements.

This SMS is sent to the outgoing SMS server of the telecommunication operator, so that, through the interconnection network, it arrives to the SMS server of the addressee operator and can be delivered to the destination mobile of the contract receiver. This SMS may be answered or not. In the case it is answered with any text, the message arrives to the mobile operator destination server and it is directed through the interconnection network to the incoming messages server of the Operator. Once there, it will proceed to the certification server which will decide, according to the policy decided, the moment of generating the certified electronic contract.

Figure 3:
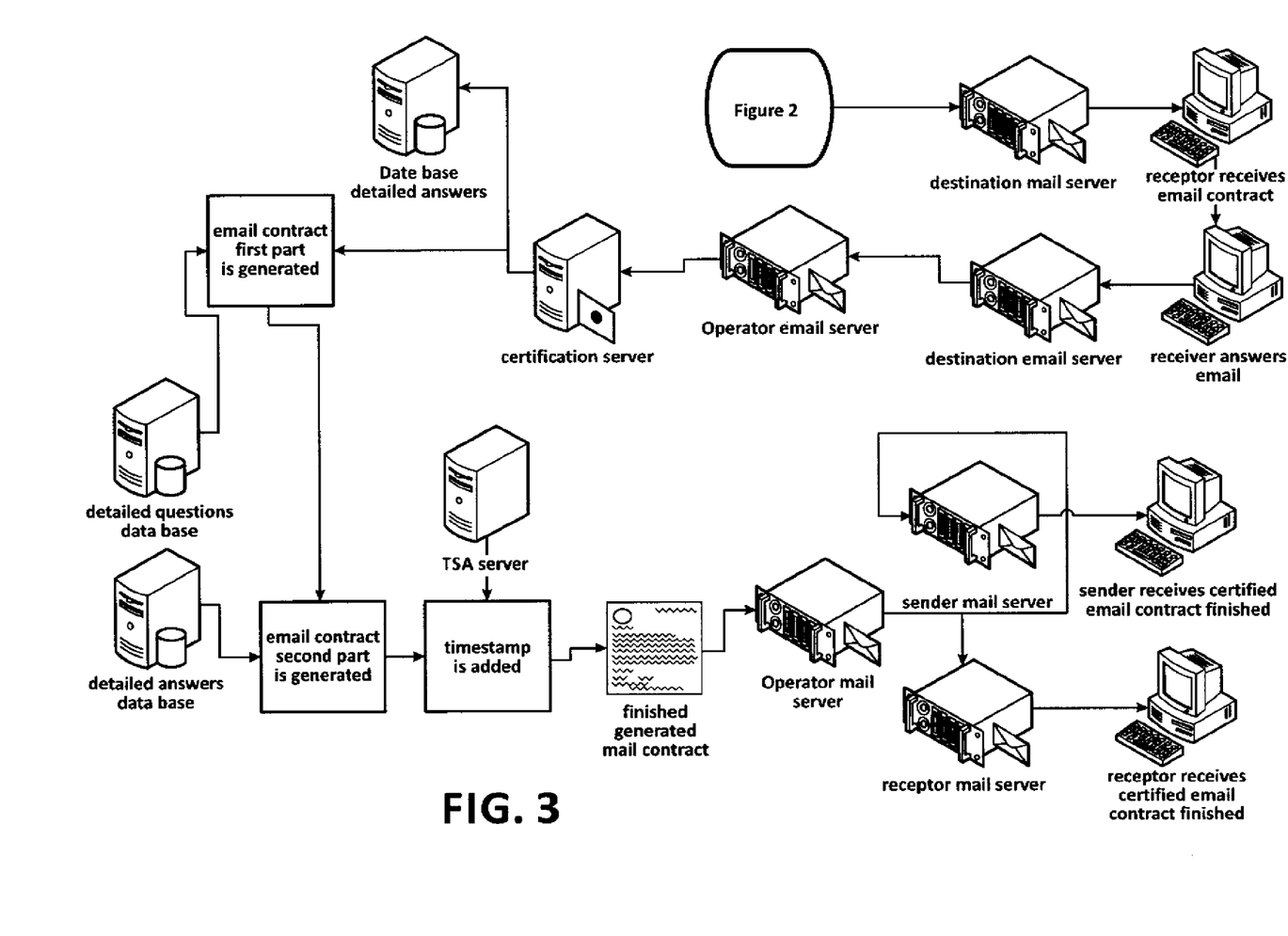
FIG. 3.—It shows a flow diagram of an exemplary embodiment of the method object of the invention of sending the request and receiving a response by email, and creating, sending and delivering the certified electronic contract.

In the mail process, it is sent to the outgoing mail server of the telecommunication operator, and it is determined if the mail can be delivered in the destination mail. If it cannot be delivered, the next step is the NOEX process detailed in FIG. 5.

In the case the mail can be delivered with the conditions, be read by the user and be answered, the response is sent through the mail server of the contract receiver which delivers it to the incoming mail server of the Operator, which in turn will send it to the certification server.

Once the response is received from the user, the certification server details the response data and introduces them in the answers data base. Next, the certification server generates the first part of the certificate with all the destination operator customer data, date, time, request and contents sent by the operator customer, plus the obtained data during messages traffic, previously stored in the data base where the requests are also stored.

Then, with the data contained in the answers data base, the second part is generated with the user answer. This certified electronic contract is saved in a PDF format and is digitally signed with the electronic signature of the telecommunication operator. Once this is done, a digital HASH sum of the content is carried out and a timestamp is requested to the stamps TSA server, incorporating it to the resulting PDF and thus finishing the PDF contract creation with the certified electronic contract.

Two copies of this certified electronic contract are finally sent through the Operator outgoing mail server to the contract sender and to the contract receptor, using their respective mail servers.

Figure 4:
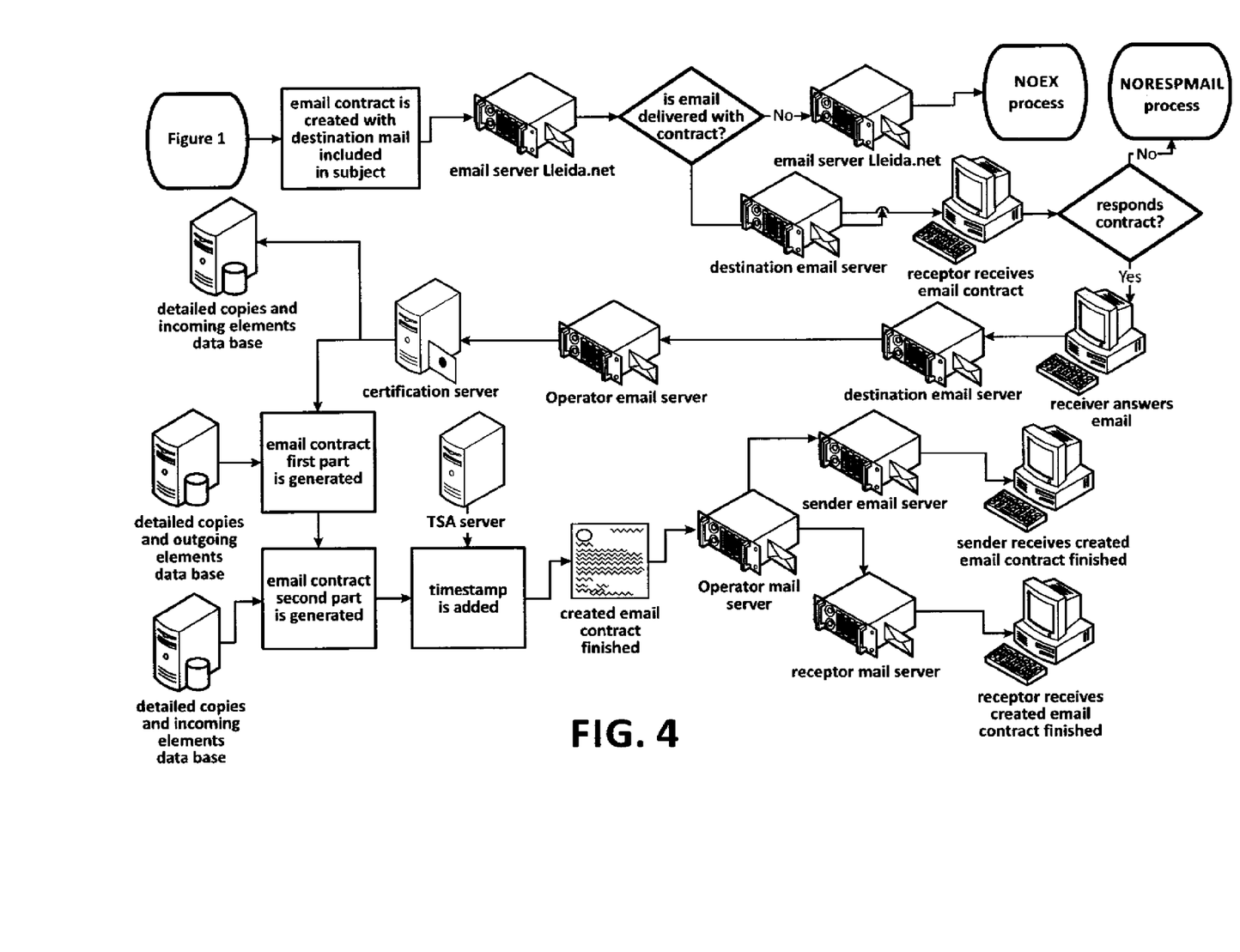
FIG. 4.—It shows a flow diagram of an exemplary embodiment of the method object of the invention of sending a request and receiving a response by electronic mail, and creating, sending and receiving of the certified electronic contract in case an SMS is not used in the process.

If the contract request from the telecommunication operator user comes without the telephone included in the electronic mail subject or topic, the process described in the flow diagram from FIG. 4 is used.

Once received and verified that there is credit provided, the mail contract is generated addressed to the address previously included in the subject of the mail and with the text included in the initial mail, sending it to the outgoing electronic server of the Operator. This will process the emails and will send them to the mail servers of the destination addresses. In the case of it not being delivered, the outgoing mail server will start a NOEX process, or a process of no existence of a mail address. The NOEX process is described in the diagram of FIG. 5.

Figure 5:
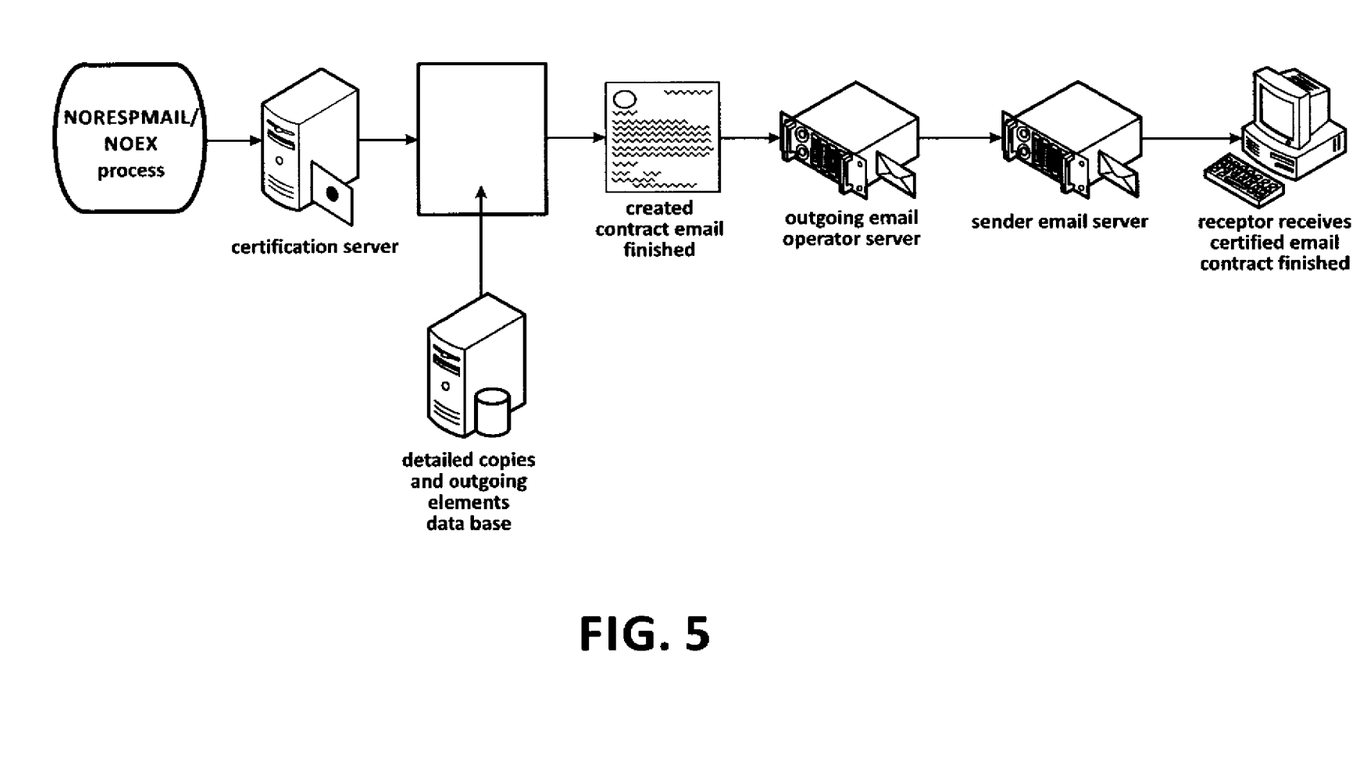
FIG. 5.—It shows a flow diagram of an exemplary embodiment of the method object of the invention in the case when no response is received from the destination user which is not a valid user, nor a customer, of the telecommunication operator.

The mail and the contract, having a sender cliente@contratos.operador.com is delivered to the destination server, delivering it to the non-customer addressee user of the telecommunication operator. If the final destination does not give a response in a period to be determined by the customer wishing to generate the contract, and generally from 24 to 48 hours, a process is started referred to as NORESPMAIL described in diagram 5.

If the non-customer destination addressee of the operator gives a response to the contract, this will be delivered to the mail server of the destination email which will send it to the incoming mail server of the operator. Once there, the incoming mail server determines that it is a certified electronic contract and sends it to the certification server.

The certification server will detail the response in all its elements and will introduce them in the response or incoming elements data base. Once this is done, the certification server starts the final process of creating the certified electronic contract firstly with the material content in the outgoing elements or requests data base including the name and corporate name, as well as the time, date and destination of delivery for the initial mail.

Once the first part is fulfilled by making the request, the second part proceeds with the response to said request which is taken from the data base of the incoming elements or responses, including the non-customer source destination address of the operator, the date, time and text being answered, as well as the IP traceability through which the message has been received.

Once the contract is done via the request and the response, it is digitally signed and a digital sum hash is realized which is sent to a timestamps server to be included within the certificate. Once created the PDF file with the contract certified and signed with the digital signature of the telecommunications operator and a third party timestamp, a copy is sent via electronic mail to the outgoing server of the operator to the telecommunication operator customer, which will be delivered through its electronic mail server; and another copy to the addressee o receiver through its electronic mail server, considering the process object of the present invention is finished.

In the diagram of FIG. 5, the process in the cases NOEX, or it does not exist, or NORESPMAIL, is detailed when the operator does not receive a response to the initial electronic mail of the operator. In this case, the certification server generates a certificate from the telecommunication operator with the initial data, indicating that, either destination does not exist, or there has not been a response. This certificate is sent to the mail server of the operator customer, finally delivering it to the customer user.

The invention claimed is:

1. A method for certifying electronic contracts by a telecommunication operator, wherein the method comprises:
   creating and sending at least one electronic message by a user of the telecommunication operator, being this a sender and the electronic message addressed to a receiver or addressee, wherein said electronic message comprises in turn at least one electronic contract, and in the subject a destination of said electronic message: a mobile number of an electronic message receiver and an electronic mail address of the electronic message receiver;
   receiving the electronic message in an incoming mail server of the telecommunication operator;
   generating in a data processing unit an electronic contract in electronic message format which is to be sent from the telecommunication operator, said electronic contract in electronic message format enclosing content sent by a customer of the telecommunication operator;
   sending the electronic contract by certified SMS to the mobile number;
   sending the electronic message with the contract attached via an outgoing electronic mail server of the telecommunication operator;
   adding a serial number to the electronic message;
   sending to a certification server the electronic message decomposed together with its serial number;
   receiving a response to an acceptance request by the addressee to at least said SMS message;
   decomposing the response by means of the certification server, in response data which in turn comprises at least one of: destination operator data, date, time, sent content, data referred to the transmission of the message and data of the requested contract to be accepted;
   generating a first certificate including at least said response data;
   generating a second certificate including at least a response generated by the receiver to the request received;
   creating a certified document of contract by joining the first certificate and the second certificate;
   digitally signing the certified document of contract certified by means of a signature of the telecommunication operator; and
   performing a digital sum HASH of the certified contract document content.

2. The method according to claim 1 characterized in that it additionally comprises verifying if the sending status is active, by verifying if it is included in data base of the users having an active status at the moment of carrying out the method.

3. The method according to claim 1, characterized in that it additionally comprises:
   generating at least two copies of the certified contract document; and
   sending through the mail server of the telecommunication operator a copy to the sender
   and to the receiver of the certified contract document, respectively.

4. The method according to claim 1, characterized in that it additionally comprises storing in an incoming data base the electronic message decomposed together with its serial number.

5. The method according to claim 1, characterized in that it additionally comprises storing the response data in a response data base to the request for the contract.

6. The method according to claim 1, characterized in that it additionally comprises adding to the certified contract document content a timestamp generated by a timestamp authority.

7. A method for certifying electronic contracts by a telecommunication operator, wherein the method comprises:
- creating and sending at least one electronic message by a user of the telecommunication operator, being this a sender and the electronic message addressed to a receiver or addressee, wherein said electronic message comprises in turn at least one electronic contract, and in the subject field a destination of said electronic message: a mobile number of an electronic message receiver and an electronic mail address of the electronic message receiver;
- receiving the electronic message in an incoming mail server of the telecommunication operator;
- determining if the address of the sending user is in a database of addresses enabled to generate certificates;
- decomposing the electronic message in at least one of: sender, receiver, addressee, destination telephone number and attachments;
- adding a serial number to the electronic message;
- sending to a certification server the electronic message decomposed together with its serial number;
- creating an electronic mail comprising the contract in a legible manner;
- creating an SMS message indicating the reception of the contract;
- sending the electronic mail and the SMS message created in the previous steps, the electronic mail being sent to at least one of the destinations included in the subject field of the electronic message through an outgoing messages server of the operator and the SMS message being sent to the addressee through the telecommunication operator, the electronic mail and the SMS message comprise an acceptance request of the contract;
- receiving a response to the request by the addressee to said electronic mail and said SMS message;
- decomposing the response, by means of the certification server, in response data which in turn comprises at least one of: destination operator data, date, time, sent content, data referred to the transmission of the message and data of the requested contract to be accepted;
- generating a first certificate including at least said response data;
- generating a second certificate comprising including at least a response generated by the receiver to the request received;
- creating a certified document of contract by joining the first certificate and the second certificate;
- digitally signing the certified document of contract certified by means of a signature of the telecommunication operator; and
- performing a digital sum HASH of the certified contract document content.

* * * * *